Jan. 5, 1932. W. TAYLOR 1,839,814
MOUNT
Filed Sept. 3, 1929 3 Sheets-Sheet 1
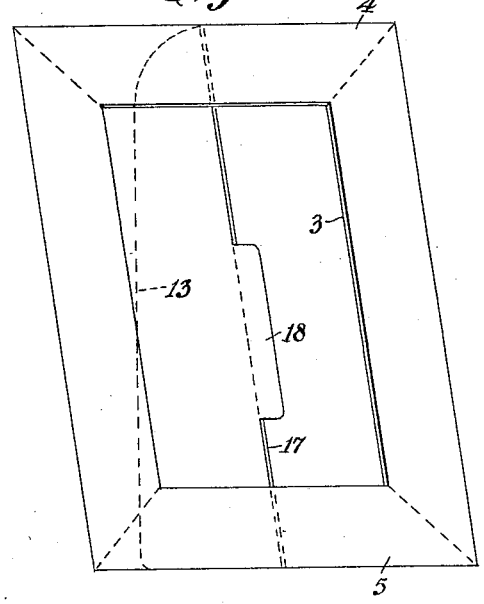
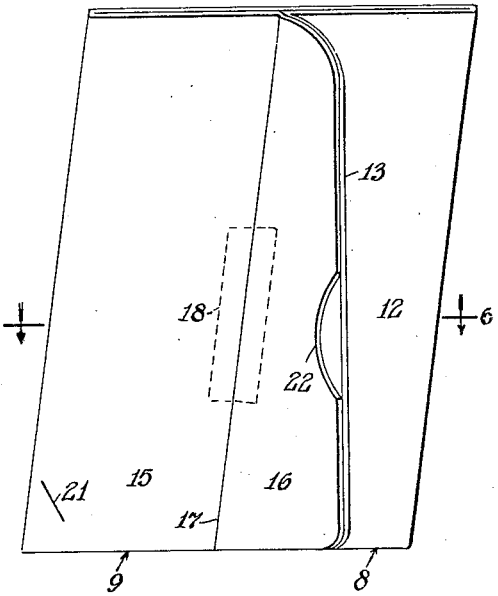
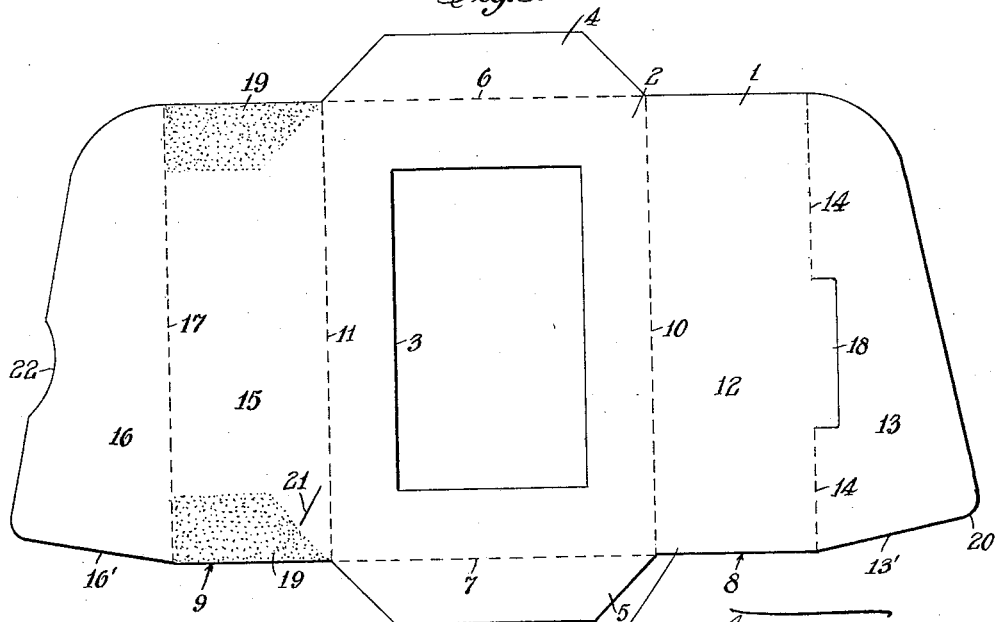

Jan. 5, 1932.  W. TAYLOR  1,839,814
MOUNT
Filed Sept. 3, 1929  3 Sheets-Sheet 2
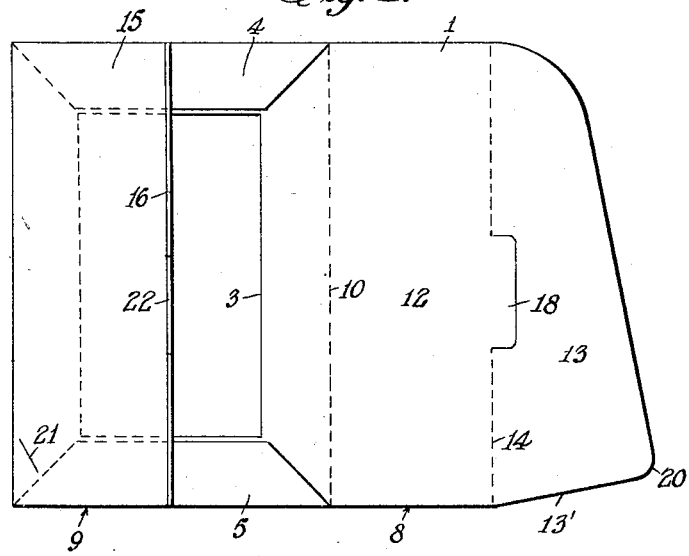
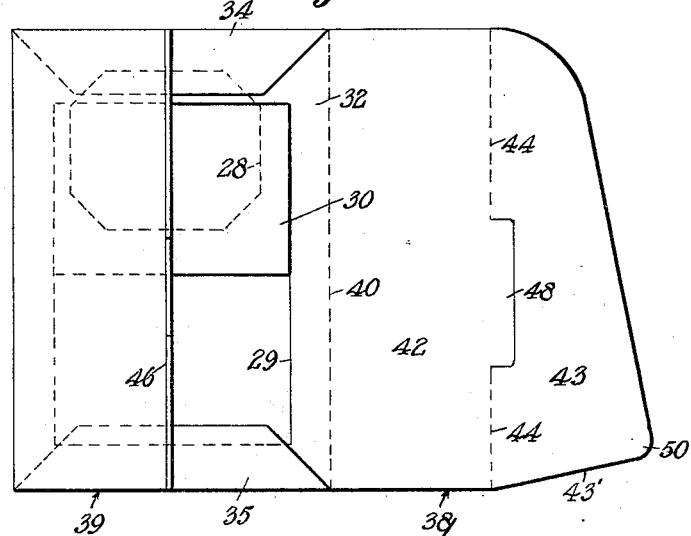

Jan. 5, 1932.  W. TAYLOR  1,839,814
MOUNT
Filed Sept. 3, 1929  3 Sheets-Sheet  3
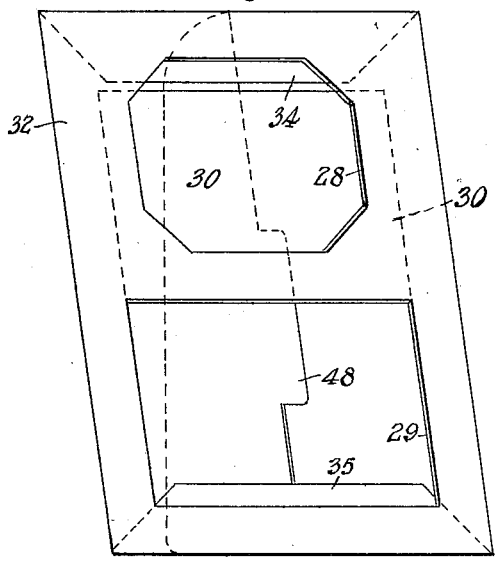
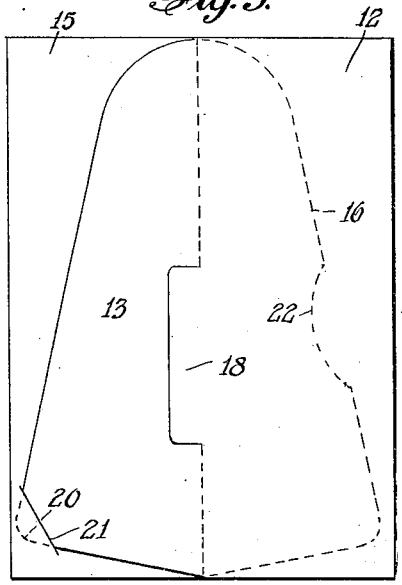
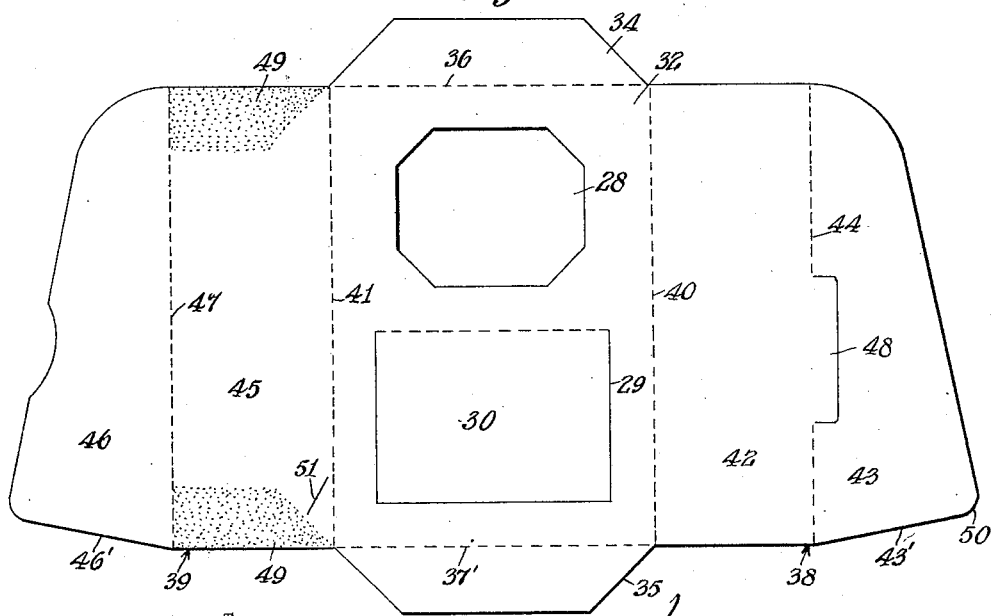
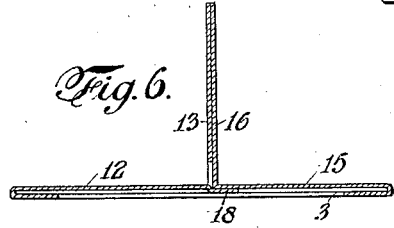

Patented Jan. 5, 1932

1,839,814

UNITED STATES PATENT OFFICE

WESLEY TAYLOR, OF NEW YORK, N. Y.

MOUNT

Application filed September 3, 1929. Serial No. 390,018.

This invention relates to mounts for photographs, pictures, advertising matter and the like and more particularly to mounts which may be converted into easels, whereby the photographs or other display may be supported during exhibition.

An object of this invention is to provide a mount in which may be positioned a photograph, picture, advertising matter of any type or other insert, said mount being provided with means, whereby it may be converted into an easel suitably supporting the matter to be displayed or converted into a flat condition, whereby it may be placed in an envelope and sent through the mails or packed, utilizing a minimum amount of space.

Other objects will appear from the following description, appended claims and accompanying drawings in which:

Figure 1 is a front view of one modification of the invention in its easel form, the material to be displayed being omitted.

Figure 2 is a rear view of the mount illustrated in Figure 1.

Figure 3 is a plan view of the blank from which the mount illustrated in Figures 1 and 2 is made.

Figure 4 is a rear view of the mount in Figures 1 and 2 in condition to receive a photograph, card or other insert.

Figure 5 is a rear view of the mount in its flattened compact condition.

Figure 6 is a section taken on lines 6—6 of Figure 2.

Figure 7 is a front view of a modification of a mount and easel illustrated in the preceding figures.

Figure 8 illustrates a plan view of the blank from which the mount illustrated in Figure 6 is made.

Figure 9 is a rear view of the mount illustrated in Figure 6 in condition to receive the inserts.

Referring to the drawings in which like reference numerals designate like parts, the reference numeral 1 designates a blank of any suitable material, such as cardboard or other relatively stiff and rigid paper, leather or the like, of which the mount is made. The blank 1 is formed with a central portion 2 which forms the front face of the mount and in which there is provided a sight opening 3 through which the photograph, picture, advertising matter or other indicia may be viewed as hereinafter explained. In the drawings the sight opening 3 is shown rectangular in shape. It is, however, to be understood that the sight opening may be of any other shape as, for instance, octagonal, oval, circular, etc. The central portion or front 2 is provided at the top and bottom thereof with flaps 4 and 5 adapted to be folded rearwardly on said portion 2 (as clearly shown in Figures 1 and 4) along the lines designated by the reference numerals 6 and 7. These lines may be scored or otherwise treated whereby the flaps may be readily bent over into their desired position. The central portion 2 is also provided with lateral wings or flaps 8 and 9 which are hinged at their point of jointure with the central portion along lines 10 and 11 respectively, whereby said flaps may be folded rearwardly.

The flap 8 is sub-divided into two portions, namely, 12 and 13, by being folded along line 14. In a similar manner the flap 9 is divided into two portions, 15 and 16, by being folded along line 17. The flap 8 is provided with a tongue 18, the function of which will at present appear. The lower edges 13' and 16' of the wings 13 and 16 respectively are preferably cut away at any suitable angle less than 90°, whereby the easel may rest on a support, as hereafter described, without any tendency to tilt or tip forward.

In producing the mount the flaps 4 and 5 are rearwardly folded along lines 6 and 7 whereby they engage the rear face of the central portion 2. The portion 15 of the flap 9, provided with glue or other adhesive along the upper and lower margins thereof as indicated by the reference numeral 19, is then folded and secured by means of the adhesive to the flaps 4 and 5, the portion 16 remaining free. At this stage the mount assumes the form illustrated in Figure 4. The flaps 4 and 5 to which the portion 15 of the flap 9 is secured, as above described, cooperates with the central portion 2 forming a pocket for the reception of the insert to be exhibited. When in the form illustrated in Figure 4, the photograph, picture or other insert may be inserted by slipping it beneath the flaps 4 and 5 and pushed forwardly until it is in the desired position. It is, of course, to be understood that the matter to be displayed or exposed registers or is within the limits of the sight opening 3.

If the mount and insert are to be packed or placed in an envelope, then the free end 16 of the flap 9 is laid in a flattened condition on the rear face of the insert. The flap 8 is then disposed on the flap 9, the mount taking the form illustrated in Figure 5. The free end 20 of the wing portion 13 is preferably disposed within a slot 21 whereby the mount is maintained in a closed, compact and flat condition.

To convert the mount into a easel, the corner 20 of the flap 8 is withdrawn from the slot 21. The free wing portion 16 is then disposed in a position perpendicular to the body of the device. The flap 8 is then folded along lines 10 and 14, whereby the portion 12 thereof lies flat against the body and the portion 13 is perpendicular thereto. In this condition the two portions 13 and 16 engage one another and assume the perpendicular position relative to the body illustrated in Figures 2 and 6. Due to the angle at which edges 13' and 16' are disposed, the mount is slightly inclined rearwardly, whereby the easel rests securely and there is no tendency for the mount to tip toward the front.

To prevent accidental collapsing of the easel formed as above described, the tongue 18 is disposed beneath the edge formed adjacent the bend at line 17 of the flap 9 (see Figure 1). When the tongue is positioned as just described, a substantially rigid easel is formed whereby it may be disposed on any suitable support without any tendency to tilt or collapse. To convert the easel mount into its compact condition, it is only necessary to withdraw the tongue 18 from its locked position and flatten the wing portion 16 of the flap 9 on to the body and thereupon lay the flap 8 also in its flattened state, the extremity 20 being inserted in the slot 21 as above described. A cut-out portion 22 may be provided in the wing 16 whereby a finger grip on the wing 13 may be readily had during the conversion of the easel into the compact form.

The mount above described defines a construction in which one insert may be exposed to view. It is, of course, apparent that a plurality of sight openings may be provided whereby a plurality of inserts may be simultaneously exhibited. The sight openings may be so constructed that the inserts may be removed irrespective and independent of one another. Such a construction finds use in advertising wherein one insert may be retained for a substantial period of time and the other removed at predetermined intervals.

In Figure 7 there is illustrated an easel mount formed from the blank illustrated in Figure 8. The mount disclosed in this figure differs from that illustrated in the preceding figures in that the central portion or front thereof is provided with two sight openings 28 and 29 disposed in the upper and lower portions of said central portion, and in the manner of supporting an exhibit so that it may be exposed through the sight opening. To attain the latter, various means may be used. I have found that a tongue 30 produced in the formation of the sight opening 29 and secured at the top edge thereof, when folded upwardly as illustrated in Figure 9, cooperates with the flap 34 and forms a pocket for the reception of the insert. In all other details the blank 32 illustrated in Figure 8 is similar to that illustrated in Figure 3. It is provided with flaps 34 and 35 at the top and bottom thereof, said flaps being adapted to be folded rearwardly along lines 36 and 37. The central portion 32 is also provided with lateral wings or flaps 38 and 39 adapted to be folded rearwardly along lines 40 and 41. The flap 38 is divided into two portions 42 and 43 by being folded along line 44. The flap 39 is similarly divided into two portions 45 and 46 by being folded along line 47. The flap 38 is also provided with a tongue 48. The lower edges 43' and 46' of the wing portions 43 and 46 respectively are cut away at an angle less than 90° similar to that illustrated in Figure 3. The extremity 50 of the lateral flap is adapted to cooperate with a slot 51 when in the compact condition.

A mount is formed in a similar manner to that previously described. The flaps 34 and 35 are folded rearwardly on to the central portion 32. The tongue 30 is folded upwardly. The portion 45 of the flap 39 with adhesive on the marginal portions thereof indicated by the reference numeral 49 is secured to the flaps 34 and 35. In this condition the mount assumes the form illustrated in Figure 9. The insert to be displayed in the upper sight opening is then introduced between the tongue 30 of the flap 34. After the insertion of the exhibit in the upper position, an insert preferably of the size equal or approximately equal to that of the amount is inserted beneath the flaps 34 and 35 similar to the insertion of the insert in the modification having a single sight opening.

It is, of course, obvious that the card or insert used for this purpose has indicia on the lower portion thereof so that, when in position, it may register with the lower sight opening and be exposed to view. The mount may be made to assume a flattened compact condition or be converted into an easel similar to that explained above by the disposition of the wing 46 and flap 38. When made to assume a flattened compact condition, it assumes the form illustrated in Figure 5 and when formed into an easel mount, it is as illustrated in Figure 7. It is apparent that in this construction either one or both of the inserts may be changed independently of the other.

In the modification immediately above described, reference is made to two sight openings. It is, of course, to be understood that any number of sight openings and of any desired shape may be used.

Since it is apparent that various changes may be made in the details above described, this invention is not limited thereto except as set forth in the appended claims.

I claim:

1. A mount for photographs, pictures, advertising matter or the like comprising a face having a sight opening therein, flaps folded on the rear surface of said face at the top and bottom thereof, a flap at one side of said face, said flap having a portion thereof secured to the flaps at the top and bottom of said face and a free portion constituting a wing adapted to be positioned in the same plane as the other portion of said flap or at an angle thereto, another flap at the other side of said face adapted to be folded flat on the rear of said face or to form flattened and wing portions to cooperate with said first-named lateral flap and wing to form a flattened or easel structure.

2. A mount for photographs, pictures, advertising matter or the like comprising a face having a sight opening therein, flaps folded on the rear surface of said face at the top and bottom thereof, a flap at one side of said face, said flap having a portion thereof secured to the flaps at the top and bottom of said face and a free portion constituting a wing adapted to be positioned in the same plane as the other portion of said flap or at an angle thereto, another flap at the other side of said face adapted to be folded flat on the rear of said face or to form flattened and wing portions to cooperate with said first-named lateral flap and wing to form a flattened or easel structure, and means in the second-named lateral flap adapted to cooperate with the first-named lateral flap to position the wings of said flaps and prevent collapsing thereof when an easel structure is desired.

3. A mount for photographs, pictures, advertising matter or the like comprising a face having a sight opening therein, flaps folded on the rear surface of said face at the top and bottom thereof, a flap at one side of said face, said flap having a portion thereof secured to the flaps at the top and bottom of said face and a free portion constituting a wing adapted to be positioned in the same plane as the other portion of said flap or at an angle thereto, another flap at the other side of said face adapted to be folded flat on the rear of said face or to form flattened and wing portions to cooperate with said first-named lateral flap and wing to form a flattened or easel structure, and a tongue in the second lateral flap cooperating with the first-named lateral flap to position the wings and prevent collapsing thereof when an easel mount is desired.

4. A mount for photographs, pictures advertising matter or the like comprising a face having a sight opening therein, flaps folded on the rear surface of said face at the top and bottom thereof, a flap at one side of said face, said flap having a portion thereof secured to the flaps at the top and bottom of said face and a free portion constituting a wing adapted to be positioned in the same plane as the other portion of said flap or at an angle thereto, another flap at the other side of said face adapted to be folded flat on the rear of said face or to form flattened or wing portions to cooperate with said first-named lateral flap and wing to form a flattened or easel structure, said second-named flap having a tongue adapted to be disposed beneath the portion of the first-named flap secured to the top and bottom flaps when an easel mount is desired.

5. A mount for photographs, pictures, advertising matter or the like comprising a face having openings in the upper and lower portions thereof, flaps folded on the rear surface of said face at the top and bottom thereof, means disposed beneath the upper opening and cooperating with the top flap to provide a pocket for the reception of an insert to be exposed through the upper opening, a flap at one side of said face, said flap having a portion thereof secured to the flaps at the top and bottom of said face, and a free portion constituting a wing adapted to be positioned in the same plane as the other portion of said flap or at an angle thereto, another flap at the other side of said face adapted to be folded into positions cooperating with said first-named lateral flap and wing whereby a compact flattened or easel structure is secured, the second-mentioned lateral flap having a tongue adapted to be disposed beneath the first-named lateral flap when an easel mount is desired.

In testimony whereof, I have affixed my signature to this specification.

WESLEY TAYLOR.